United States Patent

Brealey et al.

[11] Patent Number: 6,026,401
[45] Date of Patent: Feb. 15, 2000

[54] LOCKING TOOL DATA OBJECTS IN A FRAMEWORK ENVIRONMENT

[75] Inventors: Christopher Lawrence Brealey, North York; Jeffrey Grant Johnston, Scarborough; Vladimir Klicnik, Oshawa; David Martin Lauzon, Etobicoke; Lok Tin Loi, East York; Dirk Alexander Seelemann, II, Thornhill, all of Canada

[73] Assignee: International Business Machines Corporation, Armonk, N.Y.

[21] Appl. No.: 08/950,116

[22] Filed: Oct. 14, 1997

[51] Int. Cl.[7] .................................................. G06F 17/30
[52] U.S. Cl. .............................. 707/8; 707/201; 711/145; 711/150; 395/200.4
[58] Field of Search .................................. 707/8, 9, 103, 707/201; 711/150, 145; 395/200.4

[56] References Cited

U.S. PATENT DOCUMENTS

| | | | |
|---|---|---|---|
| 4,574,350 | 3/1986 | Starr | 364/200 |
| 4,809,168 | 2/1989 | Hennessy et al. | 395/674 |
| 5,063,504 | 11/1991 | Jordan, Jr. | 395/725 |
| 5,101,488 | 3/1992 | Rosenthal et al. | 707/8 |
| 5,226,143 | 7/1993 | Baird et al. | 711/145 |
| 5,230,070 | 7/1993 | Liu | 711/145 |
| 5,261,069 | 11/1993 | Wilkinson et al. | 395/425 |
| 5,287,521 | 2/1994 | Nitta et al. | 395/725 |
| 5,293,600 | 3/1994 | Vriezen | 711/152 |
| 5,325,533 | 6/1994 | McInerney et al. | 395/701 |
| 5,392,433 | 2/1995 | Hammersley et al. | 395/725 |
| 5,410,697 | 4/1995 | Baird et al. | 395/650 |
| 5,428,729 | 6/1995 | Chang et al. | 345/331 |
| 5,440,743 | 8/1995 | Yokota et al. | 395/650 |
| 5,550,971 | 8/1996 | Brunner et al. | 707/3 |
| 5,553,240 | 9/1996 | Madduri | 395/200.03 |
| 5,590,326 | 12/1996 | Manabe | 711/150 |
| 5,734,909 | 3/1998 | Bennett | 710/200 |
| 5,761,659 | 6/1998 | Bertoni | 707/8 |

OTHER PUBLICATIONS

C. J. Date "An Introduction toDatabase Systems", 6th Edition, p395–396, Aug. 1995.

*Primary Examiner*—Jean R. Homere
*Attorney, Agent, or Firm*—Jay P. Sbrollini

[57] ABSTRACT

When data, such as tool data, is commonly accessible, there is a danger that concurrent user processes will make overlapping modifications and leave the data in an incomplete or incomprehensible state. The invention provides a locking mechanism to guard against this. The lock objects are maintained in pool or repository. Two types of lock objects are provided; shareable locks that may be shared by many user processes and permit only read access to the locked data, and exclusive locks, useable by only one user process at a time, that permit the owning process to modify the locked data.

4 Claims, 9 Drawing Sheets

```
class Object {
public:
// Object's name
    void    setName    ( String name );
    String  getName    () const;
// Object's attributes
    Cursor* attrCursor () const;
    void    setString  ( String variable, String value );
    void    setBlob    ( String variable, Blob const& value );
    void    clear      ( String variable );
    String  getString  ( String variable ) const;
    Blob    getBlob    ( String variable ) const;
    String  varAt      ( Cursor const& cursor ) const;
// Object's relationships
    Cursor*  relCursor () const;
    Relation getRel    ( String name ) const;
    Relation relAt     ( Cursor const& cursor ) const;
};
```

FIGURE 2

```
class Relation {
public:
// Relationship's name
    String  getName    () const;
// Relationship's objects
    Cursor* newCursor  () const;
    void    add        ( Object const& object, Kind kind );
    Boolean remove     ( Object const& object );
    Boolean locate     ( Object const& object, Cursor& cursor ) const;
    Object& elementAt  ( Cursor const& cursor ) const;
};
```

FIGURE 3

```
class Blob {
    Cursor*   newCursor  () const;
    void      assignVal  ( String key, String value );
    String    getVal     ( String key ) const;
    Boolean   locate     ( String key, Cursor& cursor ) const;
    String    valueAt    ( Cursor const& cursor ) const;
};
```
3b

FIGURE 4

```
class SearchContext {
    void      add      ( Object const& object );
    String    getVal   ( String variable ) const;
    String    getBlob  ( String variable ) const;
};
```
7

FIGURE 5

```
class DeleteLockContext {
    DeleteLockContext    ( Object const* objectToDelete );
};

class RenameLockContext {
    RenameLockContext    ( Object const* objectToRename );
};

class ModifyLock {
    ModifyLock           (Object const* object ToModify);
};
```
8

FIG. 9
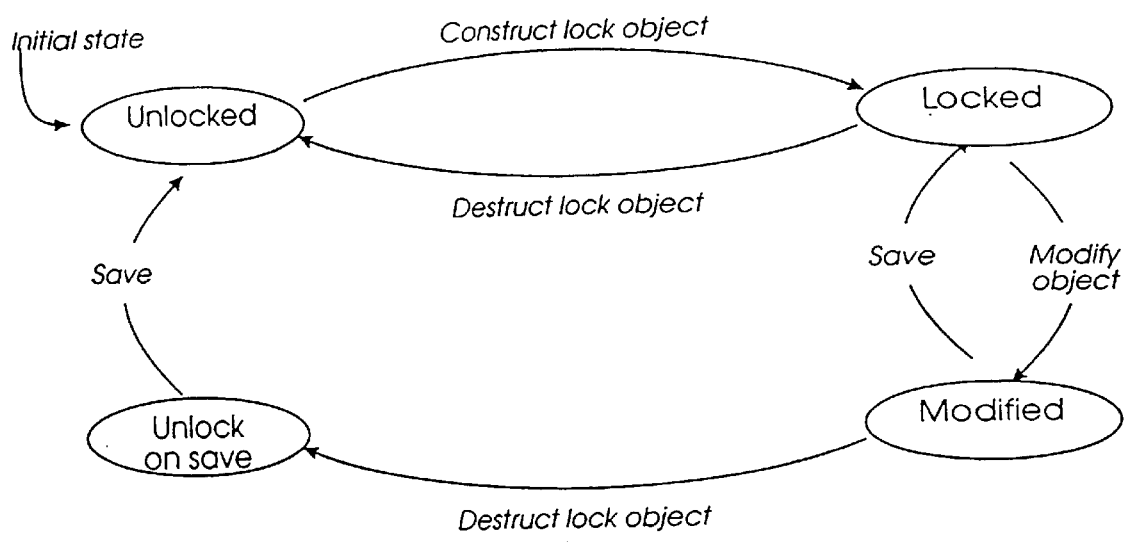
Legend
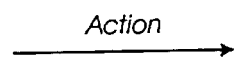
Action

LOCKING TOOL DATA OBJECTS IN A FRAMEWORK ENVIRONMENT

The present invention relates in general to the data processing field, and particularly relates to a locking mechanism for common access tool data.

BACKGROUND OF THE INVENTION

The related "An Object Oriented Framework Mechanism Providing Common Object Relationship and Context Management for Multiple Tools", U.S. application Ser. No. 08/950,117, relates to a framework mechanism for tool data management. The locking mechanism of the present invention can be used in such an environment.

Tools are units of software, programs or application modules within programs, that store, manage and retrieve data for the user. Every new tool under development includes work to design, implement and test the storage mechanisms for the tool data. As a result, the costs associated with new tool development (both in time and money) are generally not insignificant.

Most tools have their own mechanisms for storing and managing data which is often "proprietary". In this context, proprietary means that details of the implementation are not shared with other tool manufacturers or developers. This leads to a number of problems associated with customizing and extending existing, proven tools to meet individual user needs. For example, the interface or "view" portion of a tool may be intertwined with a storage mechanism or model of a tool, leading to difficulties in integrating new views with existing ones. This is referred to as a lack of neutrality in the tool.

Also, data produced by one tool cannot be consumed directly or transparently by another tool. Instead, operations such as "export", which writes data to a foreign format consistent with other tools, and "import", which reads data of a foreign format, are required, and the user of a tool must consciously choose to export or import data between tools.

In addition, portions of data imported from a foreign format may be meaningless to or incompatible with the data store of the importing tool and summarily discarded. This sacrifices round trip integrity of the information, and iterative development of information in more than one tool becomes difficult or impossible.

Finally, tool developers must monitor revisions to or the invention of other tools that manage similar data, and add new function to export and import the corresponding new data formats. In addition to the raw expense of developing and testing new import and export functions, there is the time lag between the introduction of a new format and the availability of import and export fuinctions in other tools to handle the format.

Object oriented (OO) programming, and in particular OO framework technology, provide a way to address the cost associated with constantly reworking existing tools and provide data integrity in the use of multiple tools.
Object Oriented Technology v. Procedural Technology Though the present invention relates to a particular OO technology (i.e., OO framework technology), the reader must first understand that in general, OO technology is significantly different then conventional, process-based technology (often called procedural technology). Both technologies can be used to solve the same problem, but the ultimate solutions to the problems are always quite different. This difference stems from the fact that the design focus of procedural technology is wholly different than that of OO technology. The focus of process based design is on the overall process that solves the problem. By contrast, the focus of OO design is on how the problem can be broken down into a set of autonomous entities that can work together to provide a solution. The autonomous entities of OO technology are called objects. In other words, OO technology is significantly different from procedural technology because problems are broken down into sets of cooperating objects instead of into hierarchies of nested computer programs or procedures.

A significant feature of OO programming is that the objects are reusable software entities that can be combined in different combinations or ascribed different attributes for different uses. An example of this is found in U.S. Pat. No. 5,550,971 for Method And System For Generating A User Interface Adaptable To Various Database Management Systems, of U.S. West Technologies, Inc., which describes a dynamic model for generating a user interface with various "information forms" illustrating a data base schema. The model is transportable to different data base management systems without the user having to learn different query languages, data base systems and specific data base records, fields and relationships. The model is implemented by a set of concrete classes whose instances represent entities and relationships at various distances from an actual data base. Objects of these classes are created and interrelated to describe the organization of a data base. The model classes provide standard interfaces for exploring the structure of an actual data base to create a user interface and for caching data base information consumed by the user interface.

Along similar lines is U.S. Pat. No. 5,428,729 for System And Method For Computer Aided Software Engineering, of IBM Corporation, which describes a system designed to track the location of and access to data entities (documentation, source code, test data), and to reference procedures for the translation of data (compilers, editors, linkers, documentation formatters, test harnesses) within the context of a software project under development. Each new project under development is created from a template by the "metaprogrammer" and is presented via a GUI (graphical user interface). From this "master view", each user can clone a "user view" consisting of a subset of objects from the master selected according to the access rights of the user. Through a view, specific flows are described wherein a user can access data entities to edit, define and dispatch build procedures, and define and dispatch test cases. Access rights relate users to objects via "classes" of users. This patent is oriented around the appearance and flow of a GUI and how it provides access to files stored in arbitrary but distinct repositories, stores rules for translating files from source to target form, and controls access via user-specific views of a project. However, this is not an object oriented data integration framework, and a fundamental difference between this system and the present invention is that the patented system is not designed to promote consistent behavioural feel amongst multiple distinct and unknown tools through specified but extensible framework interfaces and protocols.

Terms and phrases have evolved in the art which have particular meaning to those skilled in the art of OO design. However, the word "framework" is one of the most loosely defined; it means different things to different people. Therefore when comparing the characteristics of two supposed framework mechanisms, care should be taken to ensure that the comparison is appropriate.

As described more specifically below, the term "framework" is used in this application to describe an OO mechanism that has been designed to have core function and extendable function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

An OO framework mechanism can generally be characterized as an OO solution. Nevertheless there is a fundamental difference between a framework mechanism and a basic OO solution Framework mechanisms are designed in a way that permits and promotes customization and extension of certain aspects of the solution. In other words, framework mechanisms amount to more than just a solution to the problem. The mechanisms provide a "living" solution that can be customized and extended to address individualized requirements that change over time. As discussed in the background portion above, the custontization/extension of quality of framework mechanisms is extremely valuable to purchasers because the cost of customizing or extending a framework is much less than the cost of replacing or reworking an existing non-framework solution.

Therefore, when framework designers set out to solve a particular problem, they do more than merely design individual objects and how those object interrelate. They also design the core function of the framework (ie, that part of the framework that is not to be subject to potential customization and extension by the framework consumer) and the extensible function of the framework (ie, that part of the framework that is to be subject to potential customization and extension). In the end, the ultimate worth of a framework mechanism rests not only upon the quality of the object design, but also on the design choices involving which aspects of the framework represent core functions and which aspects represent extensible functions.

An example of a framework is the subject of U.S. Pat. No. 5,325,533 for Engineering System For Modelling Computer Programs, of Taligent, Inc. The framework described in this patent provides incremental interaction, generation and build facilities for a development environment.

SUMMARY OF THE INVENTION

The present invention is directed to a mechanism for locking data objects for common tool acccess in an application development environment. The mechanism consists of a repository containing lock objects. Each lock object has a reference counter to indicate when the lock object is fully occupied. Lock objects may be referenced by the data objects.

BRIEF DESCRIPTION OF THE DRAWINGS

The embodiments of the invention will now be described in detail in association with accompanying drawings in which:

FIGS. 2 through 6 are class diagrams, expressed in C++, of a framework mechanism according to a preferred embodiment of the invention;

FIG. 9 is a state diagram showing locking states of objects;

DETAILED DESCRIPTION OF THE PREFERRED EMBODIMENTS

The preferred embodiment of the invention has been implemented in a common data model framework that provides a base for sharing part information among different tools. The framework combines a model mechanism for standardizing the information built by individual tools and a common repository for the information supporting partitioning and code generation. An example of a common repository structure as implemented in the preferred embodiment is the subject of the related application titled "A Hierarchical Metadata Store for an Integrated Development Environment" U.S.application Ser. No. 08/956,413, and is fully described therein. The remainder of this disclosure contains references to the common repository, as needed, in order to fully understand the preferred embodiment of the present invention.

As discussed above, the principle of the framework is that the tool information is organized into model objects of various classes and relationships between those objects.

Each model object is characterized by three items of information: a name, a set of attributes and a set of relations containing references to other model objects in the framework. A model class hierarchy is shown schematically in FIG. 1. FIG. 2 illustrates the C++ interface to the object abstract class of the preferred embodiment.

Figure 1:
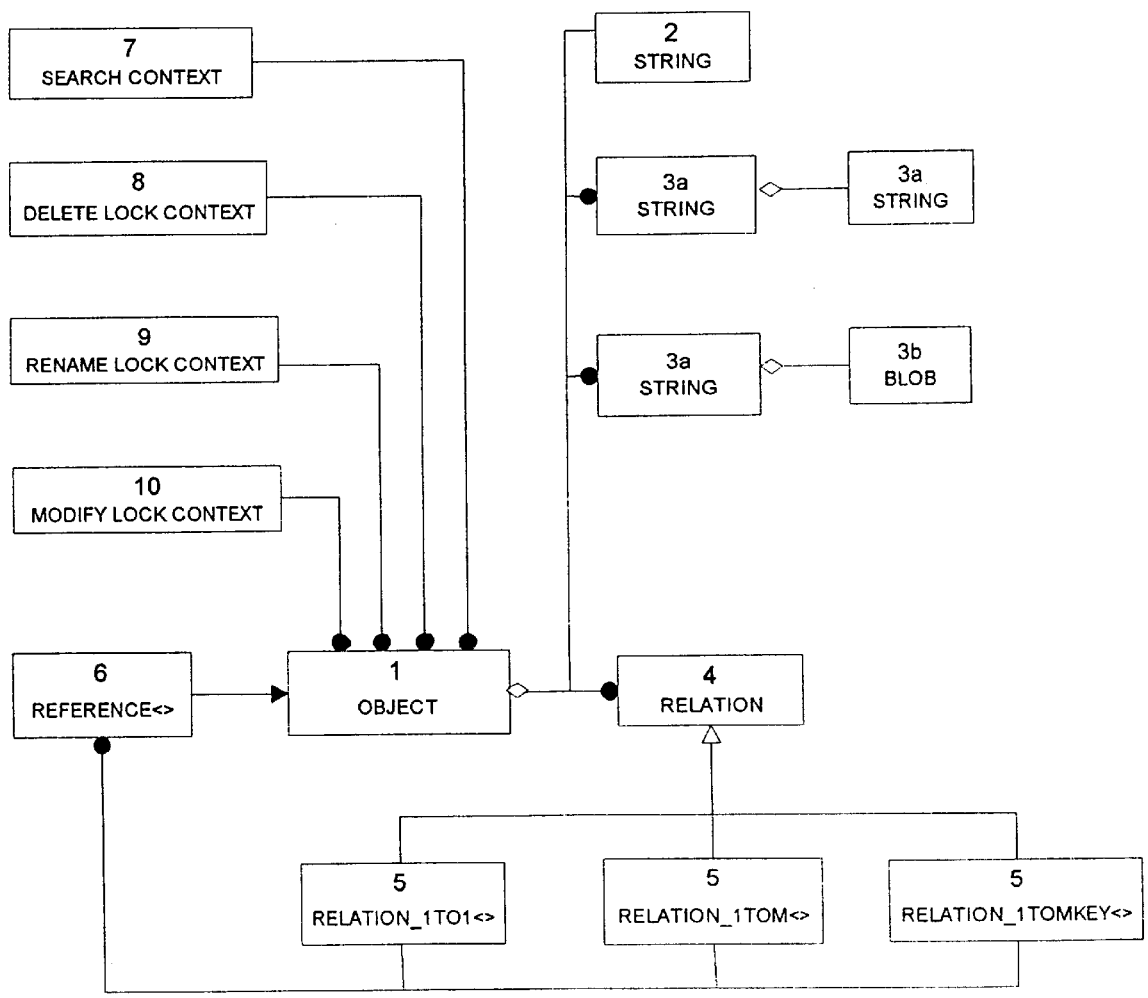
FIG. 1 is a schematic diagram, using OMT notation, showing a class hierarchy for a model object, according to the invention.

Referring to FIGS. 1 and 2, the information associated with the object 1 is defined in a number of separate strings, such as the name of the object 2 and its attributes generally designated by 3. Each attribute 3 contains a value which is either a standard string 3a or a "blob" 3b. (The term "blob" is an acronym for "binary large object", a term commonly used in database technology. Here, it refers to an amorphous string of bytes. This is described in more detail below.)

FIG. 4 shows a C++ interface to a blob abstract class according to the preferred embodiment. Values which are too complex or too highly structured to be represented in string form can be implemented as kinds of blobs. Every blob must provide operations to set and inspect segments of its data as keyed by strings whose interpretation is entirely up to the blob, Another aspect of the framework mechanism, according to the preferred embodiment, is that the relations 4 of the model object shown in FIGS. 1 and 2 are defined in separate classes and have mutually unique names FIG. 3 shows the C++ interface to a relation abstract class of the preferred embodiment that defines some of the attributes set forth below.

Returning to FIG. 1, every relation 4 of a model object 1 is characterized by a name 5 which is a string. Each relation 4 also contains a set of references 6 (0 or more) to other model objects. The relation 4 must provide operations to inspect its name and to add, inspect or remove any of its references.

The function of the reference 6 is to load its model object from disk into memory if the object is not already in memory. The references must be bidirectional. That is if one object references a second object, the second object must, in one of its relations, include a reference back to the first object. Also, references are either "strong" or "weak". When a model object 1 is deleted, all model objects it strongly references are also deleted, whereas when an object which weakly references another object is deleted, only the bidirectional references to the deleted object in the other objects are deleted.

Two other mechanisms illustrated in FIG. 1 must also be defined. These are the search context 7, and lock context. The lock context has three aspects, delete lock 8, rename lock 9, and modify lock 10.

A model object may assume different context is depending upon the path taken through the model to the object. FIG. 5 shows the C++ interface to a search context abstract class, according to the preferred embodiment. A search context 7 represents a path along the subset of the objects in a model. A search context provides operations to find and inspect attributes, and when asked to find an attribute, the search context navigates along its lists of model objects until it either encounters an object with the requested attribute or reaches the end of the list (10 in FIG. 5). If an object with the requested attribute is found, the value of that attribute is returned (11 in FIG. 5). Thus, different search contexts allow a single object in the model to appear to have different attributes.

Model objects in relationships must be locked by a tool before they can be mutated by the tool. Locking will be discussed in greater detail below in the context of the preferred embodiment of the framework hierarchy. To change the attributes of a model object, only the object itself needs to be locked. To rename a model object, the object itself needs to be locked along with all relations referencing the object by name. To delete a model object, the object itself and any objects directly or indirectly strongly referenced by the object, as well as any relations referencing these objects, must be locked Each object in each relation is independently lockable, and this basic behaviour is sufficient for an operation as simple as changing the attributes of an object. The model framework includes lock context objects to handle the more complex rename and delete scenarios. FIG. 6 shows the C++ interfaces to delete lock context 8 and rename lock context 9 abstract classes.

A rename lock context can be constructed from a model object prior to renaming the object. The rename lock context locks the model object in any relation containing a reference to the object, since some relations may be key to the object's name.

A delete lock context can be constructed from a model object prior to deleting the object. The delete lock context will lock the model object and any model object reachable by a chain of strong references (since, under the framework, they will be deleted as well), and any relation containing references to any of the aforementioned objects. These reference have to be removed from the relations to prevent dangling references.

Figure 7:
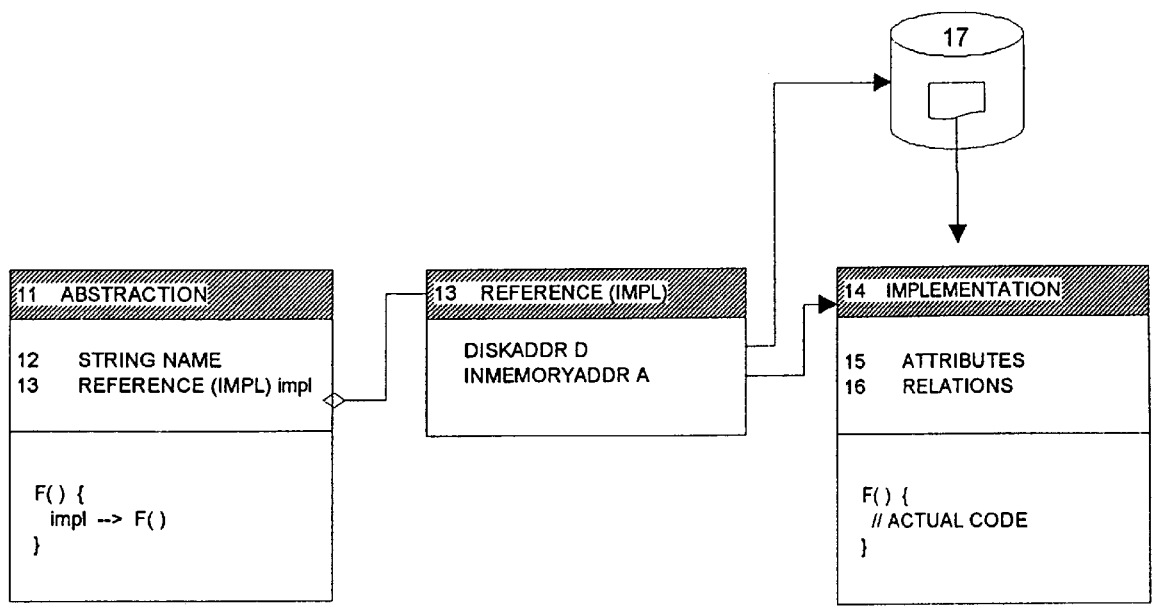
FIG. 7 is a schematic diagram, similar to FIG. 1, showing the model object as a pair of classes, according to a further preferred embodiment.

In a further preferred implementation, the object classes are actually a pair of classes, namely an abstraction class and an implementation class. This is illustrated in FIG. 7. Every model object consists of an abstraction object 11 containing a reference 13 to a corresponding implementation object 14.

The complete interface to and behaviour of an object is presented through its abstraction portion. However, only the name 12 of the object is actually stored there. The attributes 15 and relations 16 of the objects are hidden in the implementation portion. Any request for information about an object beyond its name is secretly met by the implementation portion and perhaps by some of the relations contained in it.

As the abstraction, implementation and relation objects are independently persistent, a request for the name of an object will incur the cost of loading the abstraction portion from disk 17 without the implementation portion or the relations. This technique minimizes the amount of data transferred from disk to satisfy an inquiry and improves the overall performance of the tools under the framework.

Utilizing the above definitions, the framework of the preferred embodiment provides an environment and supporting mechanisms for implementing a flexible containment hierarchy of development parts. The base classes define standard behaviour for part locking (also called containment support), references between objects, attribute/property access, runtime type identification and persistence. All tools derive concrete implementations from the base classes.

FIG. 9 illustrates an abstract base hierarchy according to a preferred embodiment of the invention. The core functions in this hierarchy are Persistence 20, Notification 21 and Locking 22, identified as base classes in the hierarchy, above the broken line. This is not to say that any of these classes may not be overwritten as is possible in C++ programming, but some form of persistence, identification and locking are core functions required for the framework of the invention to operate. The classes below the broken line, beginning with IDE Element 24 illustrate some of the data model types that can be included in the framework hierarchy. These additional classes are defined in the Appendix below, and a number of them are discussed in detail in the related application U.S. applications Ser. No. 08/956,413.

Inheritance under the framework hierarchy of the present invention operates to provide the foilowing. A persistence service maintains the state of a data model in a host computer's file system and shares this data among several running programs. Model objects derived from the framework hierarchy are grouped into files in the file system. Objects in the file system are referred to as the "committed model". When running a program using a framework model, only the data in the committed model is visible. All changes to the model are performed on in memory copies of the model objects in the private address space of a single running program.

A locking service enforces mutual exclusion from modifications to the model. Since each running program makes changes to private in-memory copies of model objects, no two programs may be modifying or deleting the same objects concurrently. The locking service provides a mandatory locking scheme which prohibits concurrent access. This is discussed in detail below.

Referring to FIG. 9, inheritance from the Persistence base class 20 provides that model objects are constructed from each program's default local heap and shared, by persistence through the host computer's file system. In many C++ implementations, dynamic or runtime binding is normally implemented as a pointer in each object to class-specific tables of constant method pointers. The method table pointers are usually stored in a dynamic link library or executable program, but are inaccessible because every executable image is different and the location of the tables is different. As a result, in ordinary implementations, it is not possible to store C++ objects in shared memory and access their data from different executables.

The Persistence service in the present invention avoids this problem through the default local heap construction.

The Persistence class 20 also provides the mechanism for all classes in the framework to write to and read from disk. All derived classes within the model that extend the base object state must provide their own "read" and "write" methods, but the Persistence class also defines a mechanism for object streaming so that a class overrides the streaming operators for use in conversion between the disk form of the object and the in-memory form. The streaming operators invoke each object's own "read" and "write" methods to do the actual processing. The following implementation convention is used in all classes in defining the "read" and "write" methods for a derived class in the preferred embodiment.

The framework provides a standard interface for implementing mandatory mutual exclusion for C++ objects, in the preferred embodiment. Classes using this implementation are derived from the Locking class 22. Since mutual exclusion is only required for objects shared among running programs, Locking 22 is itself a subclass of Persistence 20.

The locking scheme provided by Locking 22 is discussed below. However, there are two cases in which these mechanisms are inappropriate, first, in the global "parts" list, a data structure guaranteed to contain all objects of a particular type; and second, in the "dirty pool", a mechanism for updated meta information which is stored with but not as part of a model object.

The Locking class 22 is a model abstraction for a persistent object that can be locked. It provides the locking primitives used within the model. In general, these primitive are not directly used, but are rather invoked as part of a composite object lock. An object lock is constructed in two steps:
1. A lock identifier is obtained for the intended type of action. In the preferred embodiment, the lock pool is a singleton C++ class located in a scalable shared memory pool, described below that manipulates named shared memory segments of fixed size. Because of this, a lock identifier is really an array index into a pool.
2. A shared lock or an exclusive lock is then constructed using the obtained lock identifier by instantiating a lock object type. In the preferred embodiment, the lock is acquired by way of a C++ constructor which is usually used as a local instance so that the destructor will be run automatically no matter how the code block exits. Failure to get a lock is conveyed by way of an exception. The destructor frees up locks in most cases, one exception being the modify lock context.

Singleton class refers to the C++ programming convention that there can be only one instance of the class alive at a time per process.

The scalable shared memory pool is a peer to peer pooling mechanism that involves allocating fixed size segments from the system named shared memory pool. The name of a segment is created by taking a predefined character sequence and then appending the segment number (starting from 0). Each process has a singleton pool that manipulates the pool segments for that process. When a new segment is required, the name is calculated and an attempt is made to find the segment in current memory. If not found, the segment is allocated. This process is synchronized such that the first process to require the memory segment will allocate it and every subsequent process will reaccess it (hence, peer to peer as opposed to client/server). Each singleton pool class in a process keeps an array of all of the segments it knows about This allotsws access to any segment in the process as a quick indirection into the array. In addition to the array of segments, a special named area is allocated that contains global information about the pool. The name of this area is fixed and the first process to start up its pool will allocate it. Access to the global information in the pool is synchronized to avoid a race condition between two or more processes.

Each segment is treated as a fixed size array of objects so that each segment is divided into "n" pieces of size "x" (where "x" is the size of objects to be placed in pool). Each process requests to get a pool id when it needs a piece of storage. The pool uses the global information segment to find out the current highest index that has been given out. If the next value is still within a segment (i.e. is not a multiple of n), then it is simply returned. Otherwise, a check is made on all objects currently in the pool to find an object that is not in use. Each of the "n" pieces of storage in the pool segment must have an indicator to mark whether it is used, or unused, such that the singleton class can perform this check. If an unused object is found, its index is passed back and the storage is marked as used, otherwise a new segment is allocated.

Once an index has been doled out, it can be used to access the shared memory storage via a special pool method. The pool method simply takes the index and calculates the segment number and the index within the segment. It then accesses the array of segment addresses and after calculates the address of the object in the segment. In this way, the same id can be used by multiple processes, even though the shared memory may be assigned to different virtual addresses as is the case on some platforms, such as Windows™ NT. The calculation is as follows:

segment number=poolId/n segment index=poolId modulus n

The pool is scalable since it allocates segments as needed. It is peer to peer in that it does not matter how many processes are involved or in what order they are started (no server is required). The mechanism requires only two indirections to access any item by its id.

In the preferred embodiment of the present invention, the lock object types are:
1. shared lock: shared read only access; and
2. exclusive lock: restricts read/write access to one process.

As illustrated in the state diagram of FIG. 9, constructing a lock object locks access to the underlying lockable model object. Destruction of the lock object is required to unlock access, in most cases. Thus, by instantiating a delete lock type to remove the instantiation of a shared lock type, shared restricted read/write access to the underlying model object is restored. This guarantees that the object will not be deleted, and allows others to read or modify it (that is to obtain a shared or exclusive modifying lock). The exception is when the underlying locked object is modified. The lock can be destructed when the modification is saved.

Mandatory locking for construction and destruction is enforced through a convention. The constructors and destructors of framework classes are "protected". This prevents a program from directly creating or deleting an object. Instead, class data "create" and "destruct" methods are provided for every framework class. The create method obtains the lock needed to create and insert an object into the existing model before constructing the object. The destruct method obtains all the locks need to remove all references to the objects from the model before deleting the object. Failure to acquire the lock results in the modification operation being aborted, the model state being unchanged, and an exception being thrown.

Figure 10:
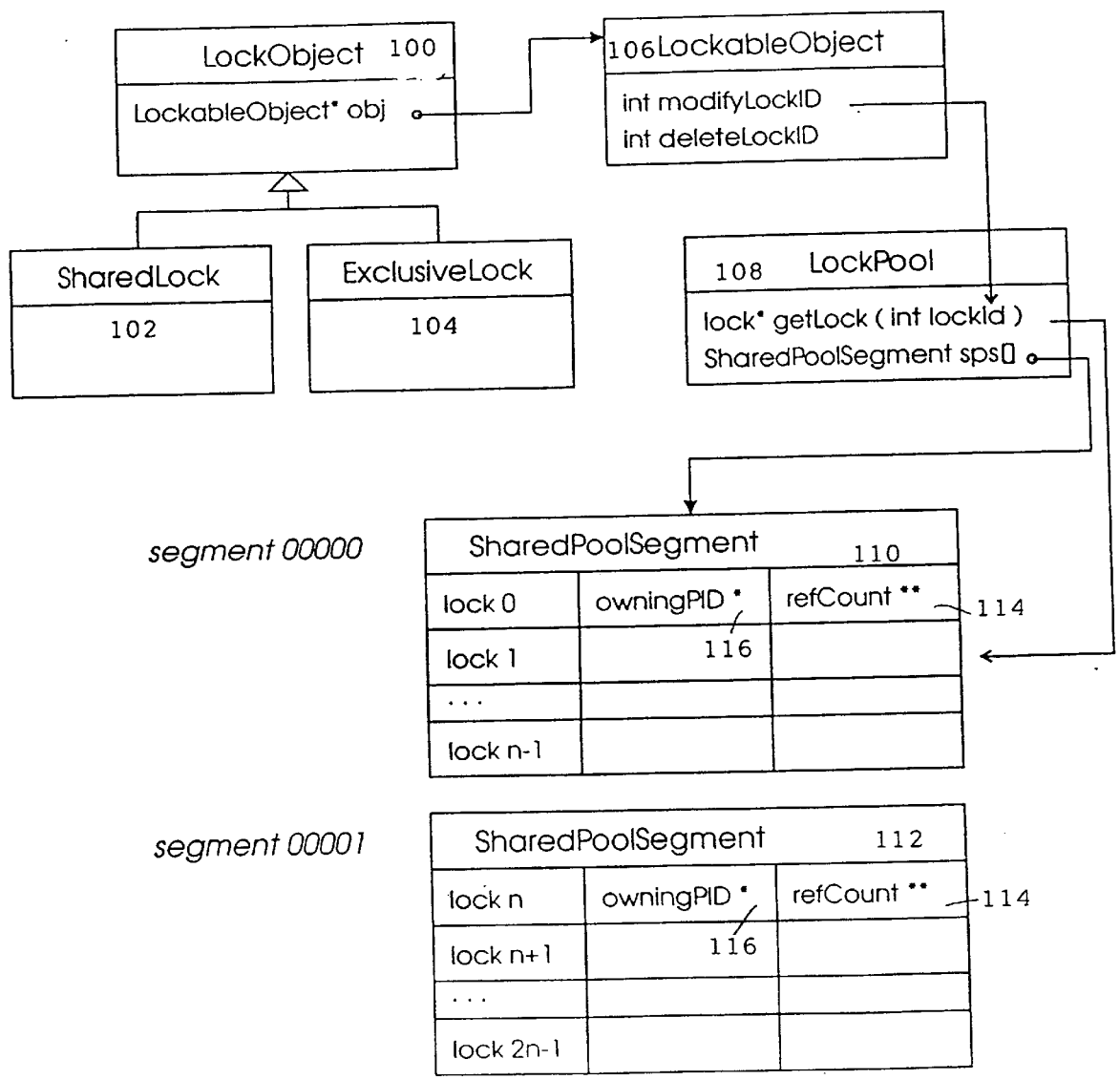
FIG. 10 is a schematic drawing showing a locking mechanism as implemented in the preferred embodiment of the invention.

The lifetime of a lock is dependent on both the persistence subsystem and the existence of a lock object referencing the lock in memory. This is illustrated in FIG. 10. The lock object class 100 has as derivatives Shared Lock 102 and Exclusive Lock 104. The difference between these is that a shared lock can have many processes; an exclusive lock is "exclusive" to one process at a time. A single process resource can have either one exclusive lock on it, or one or more shared locks.

When a lock object 100 is instantiated by a lockable object 106, a lock is located by referencing the lock pool 108 via the lock ID assigned when the lockable object is constructed. The lock 112 within the lock pool contains the process ID of the lock owner 116. If a lock owner attempts to reacquire a lock which it already owns, this is permitted.

In the case of shared locks, process IDs are always a dummy or reserved identifier. The same dummy identifier is used by all attempts to ascuire a shared lock. Thus, if a shared lock is already held by any process, the process IDs will match and the lock will be granted. To keep track of the number of shared lock owners, a reference counter is used. The counter is incremented every time the lock is acquired and decremented every time the lock is released. When the counter reaches zero, the lock is no longer owned by any process, and is available for use as either a shared or exclusive lock.

In the case of exclusive locks, the real process ID is used, to prevent sharing. A special type of exclusive lock is a "modify" lock which keeps track of a locked object's modified state. If the object is unmodified, the lock is immediately freed when its destructor is run. If the locked object is modified, the modify lock will not be released by the modify lock destructor until all changes to the locked object are committed by a save or cancelled. If the modify lock is not destructed (even when a save is performed), the object remains locked. Programs can rely on this behaviour to keep an object locked across saves.

Two exceptions were noted above for use of the locking mechanism, global parts list and "the dirty pool".

The global parts list contains a set of uniquely named objects. In the framework of the preferred embodiment this is contained in a single object, that is a singleton class. When a shared memory list containing data structures that detect name clashes is implemented, a part is added to the global list in one program, and the name of the part is tested for uniqueness in both the committed list of parts and the shared list of uncommitted part names. If the name is not unique, the add operation fails and an exception is thrown. Otherwise, the insertion operation completes, and the name is added to the shared heap to prevent other programs from using it. Each running program maintains a list of objects it inserted. When a save operation is in progress, the program removes all of these objects. By storing only the names, scalability is provided, in that the amount of shared memory used to prevent name clashes in the global part group is minimized.

The second exception is the dirty pool This refers to an index pool that tracks whether objects have been modified without a corresponding update to their source code files. An object must be regenerated when its dependencies change. Not modifying the actual object reduces lock contention among processes as well as improving performance. When the object and its source files lack concurrence, the object is referred to as "tainted" or "dirty", hence the name for the index pool. The dirty pool uses the scalable shared memory pool mechanism to support remote data for a shared object. Remote data is encapsulated object state which does not depend on the object This data can be modified without going through the lock the object, modify the object, save the object sequence, reducing the need for lock contention between processes. The pool uses a lock pool indexing scheme and one an object is assigned an identifier, a bit segment in the dirty pool index that is permanent for the life of the model object. Each dirty pool segment is divided in half the first half has the in-use bits and the second half has the dirty state bits. The pool is persistent in the preferred embodiment. The dirty pool can stream itself to and from disk. In this way, information on whether source for an object needs to be regenerated can be queried in subsequent sessions.

There are three requirements on the persistence service when committing changes to a model:

1. a program cannot read new versions of old objects while operating from the committed model;
2. failure to complete writing change to files cannot corrupt the committed models, and
3. changes made in one program cannot overwrite changes committed by another program.

Save is implemented as a two phase commit into the file system synchronized by an interprocessed communication protocol. This process is illustrated in the flow diagram of FIG. 1.

The interprocess communication protocol utilizes two events; "save pending" and "save complete". These events are implemented with a shared memory flag, a shared memory counter, and two host system semaphores called "notify" and "acknowledge".

The save starts when the saving program sends a "save pending" event (block 40). "Sending an event" consists of setting the events shared memory flag to true, initializing the model shared memory count to the number of programs attached the model, resetting the "acknowledge" semaphore, and posting the "notify" semaphore.

When the flag files indicate that phase one of a save has started (clock 42), the saving program writes all files it has modified to temporary files (block 44) Saving to temporary files prevents other programs from accessing the temporary files if they are still actively utilizing the model. This satisfies half of part one of the safe save objective, that other programs cannot mix objects from the committed model with objects in the temporary files.

Once the saving program completes writing all changed files into temporary files (block 46), it waits for the "save pending" event to complete. This will be acknowledged to the sending program when the "acknowledge" semaphore is posted (block 38).

The save pending event is processed by a worker thread found in each program attached to the framework model. When the event is received, the worker threads wake up. The threads determine if their program is attached to the model being saved by comparing all models open in the program with a model which has the saving flag set. If the program is attached to the saving model, a cross thread package is used to post the notification into the programs main thread. This notification is received asynchronously after the main thread has completed processing all GUI events and notifications received previous to the saved pending notification (block 58).

When the program main thread receives the same pending notification, it stops demand-loading or changing objects in the model (block 60). This completes requirement one, that programs cannot mix old and new objects.

As the other programs receive and process the save pending event, they acknowledge receipt of the event by decrementing the shared memory counter (block 62). When the decrementing counter equals 1, all programs have processed the "notify", and the events "acknowledge" semaphore is posted, indicating the event is complete (block 64), thereby waking the sending program (block 48).

When the "save pending" event completes, the saving program flags the first phase of the save complete through on disk flag files (block 46). Before this point, an interruption, such as a system crash, loses all changes but leaves the database in a consistent state.

If no error occurs, all the data needed to access the change version of the model is written to disk, and it is not possible for a system or program crash to leave the on-disk model in an inconsistent state. The saving program then renames all temporary files to their proper names and removes all empty data files from the committed model (block 50). This means all changed files have their contents replaced with the versions in the temporary files, and this satisfies part 2 of the safe save requirement.

The saving program sends the "save complete" event (block 56) to the waiting worker threads and program main thread, to indicate to all these other programs that the on disk model is consistent, and waits for the event to complete (block 54) before cleaning up (block 56).

Figure 11:
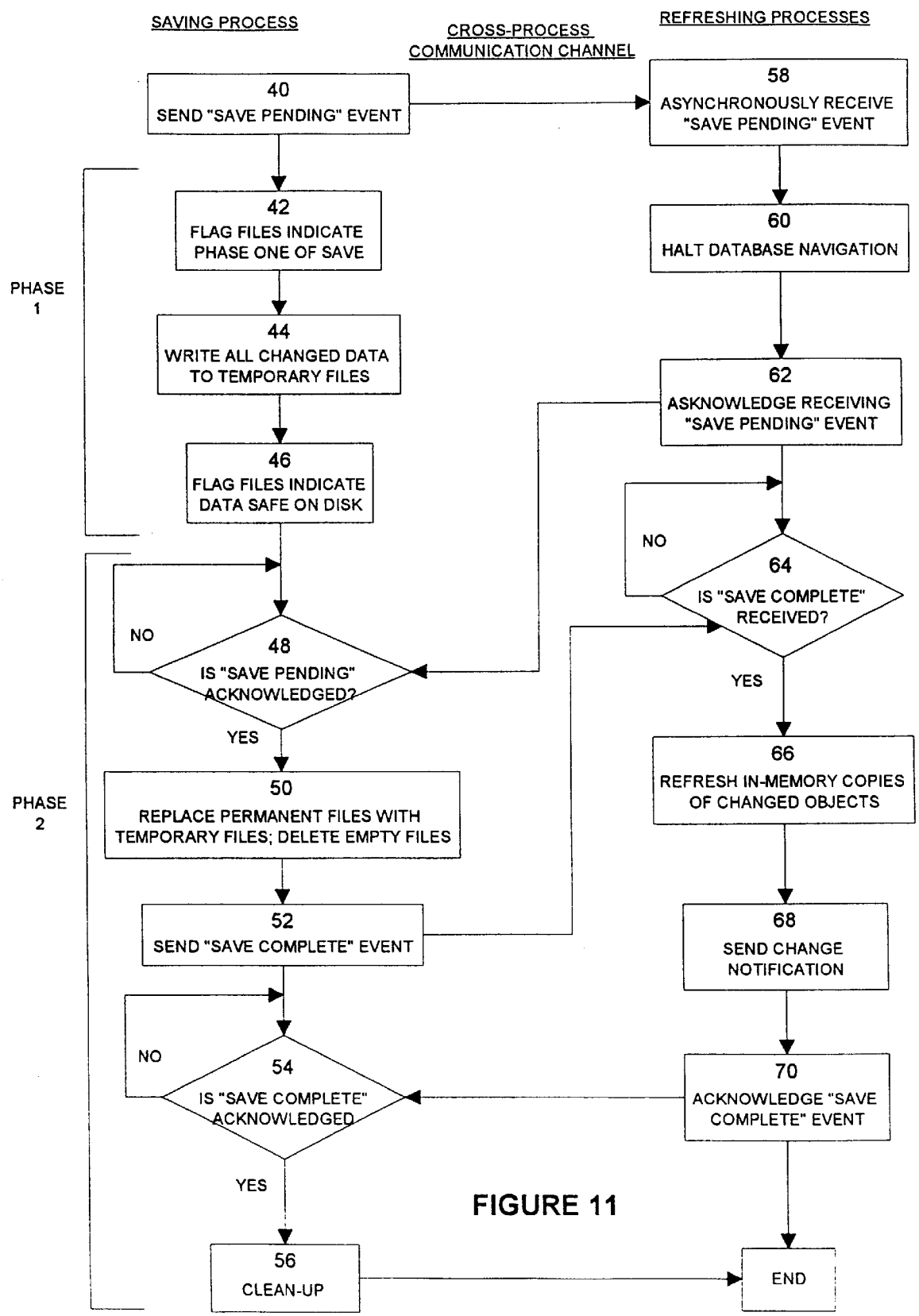
FIG. 11 is a flow diagram showing the steps for saving modifications in tool data utilising the core functions of the invention.

The other core function, found in the Notification base class 21 in FIG. 9, provides the mechanism for communicating changes in tool data in the framework to other users. This is also illustrated in FIG. 11.

All other programs attached to the model wake up when they receive the "save complete" event (block 64). These programs then call the framework refresh method which visits each file the program has opened and loads the latest revision of each changed object (block 66). Once this process is complete, every program contains a private in-memory version of the model that is consistent with the most recently saved changes. If the program contains any objects which were deleted or modified by the saving program, the program receiving the "save complete" event will also have a model/view/controller notification sent to every observer of the affected objects (block 68). Observing these notifications is the hook that programs use to make their internal state consistent with the changes committed to the model. After performing the refresh, each program acknowledges receipt of the save complete event (block 70).

Completing the save complete event wakes the saving program and all the worker threads. The saving program completes any housekeeping chores and returns from save. The worker threads return to their waiting state on the save pending interprocess event.

Figure 12:
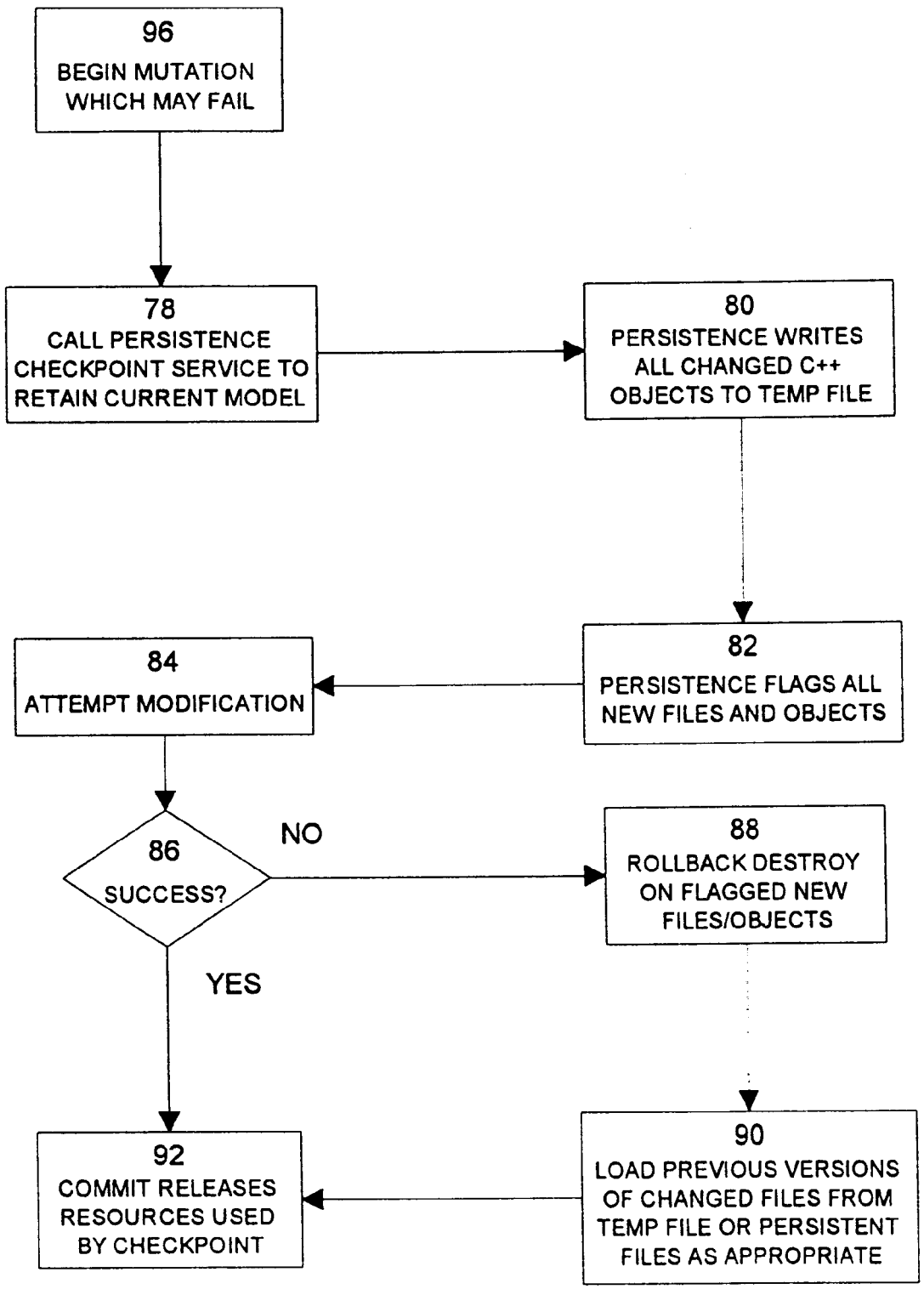
FIG. 12 is a flow diagram showing the steps for issuing notifications of modifications in tool data utilising the core functions of the invention.

As it is not always possible to determine in advance whether an operation changing many model objects will complete successfully, in a further preferred embodiment of the invention, the persistence service provides the ability to return to a known good state in the event of a failure. This process is illustrated in FIG. 12.

This check point mechanism restores the private in-memory state of a program. The state to be saved includes all object deletions, creations and modifications which have occurred since the program started or saved the model as well as the persistence service data structures used to manage the objects and data files. During operation of the check point mechanism, this data is preserved in a temporary file.

A program calls the check point mechanism to indicate it is starting a modification which may require restoring the previous state (block 76). The persistence subsystem then visits each persistence file opened by the program on the model. The persistence system identifies objects for which the in memory state is different from the committed state (block 78). In memory, modified objects are flagged as saved into the temporary file (blocks 80, 82).

When an attempted modification is unseccessful, usually because an exception is thrown and caught (blocks 84, 86), a "roll back" method is called (block 88). The roll back method recreates objects deleted after check point, removes objects created since the check point, and restores the state of all modified objects and of the persistence service data structures to their state when check point was called (block 90).

If the process determines that the algorithm completed successfully (blocks 84, 86), it calls "commit" (block 92) to release the resources used by the check point mechanism and to flag the internal model state as consistent.

Modifications to the above preferred embodiments of the invention which would be obvious to those skilled in the art are intended to be covered within the scope of the appended claims.

APPENDIX

Figure 8:
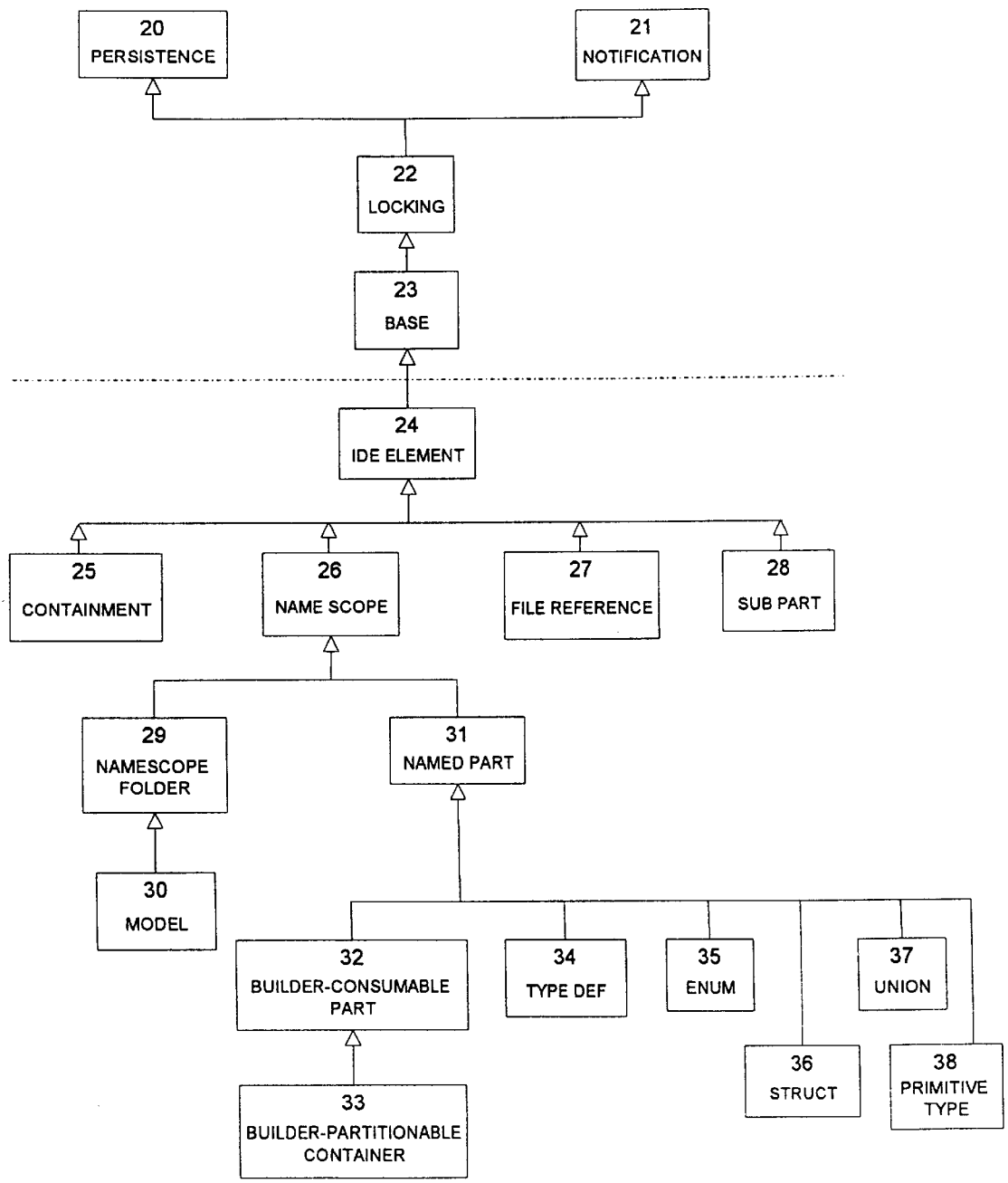
FIG. 8 is a hierarchical category diagram, using OMT notation, of a framework mechanism constructed in accordance with the teachings of the present invention.

The following defines data model classes set out in FIG. 8 according to the preferred embodiment:

Base: Name, named properties, named relations

IDE Element: Permits construction/manipulation of graphical tree view/tree element Containment: Folders/grouping Scope: Name space scoping File Reference: One disk file pointer Sub Part: For example, a C++ data member Namescope Folder: Name space scoped grouping concept Named Part: Based composed type Model: Singleton root Builder-Consumable Part: Component—permits composition/manipulation bya composite editor Type Def: Part alias Enum: Named cardinal values set Struct: Record Union: Overlapped structures Primitive Type: Fundamental types Builder-Partitionable Container: Part partitioning allowing distribution The embodiments of the invention in which an exclusive property or privilege is claimed are defined as follows:

1. A mechanism for locking data objects for common tool access in an application development environment comprising:

a repository comprising lock objects, each lock object having data to designate its state as occupied or free of an owning process; and means for referencing lock objects from the data objects;

wherein the lock objects comprise:

shareable locks each having an indicator to designate its state as owned by multiple processes; and exclusive locks each having an indicator to designate its state as owned by a single process;

wherein the indicator for each shareable lock comprises a reserved process identifier; and wherein the indicator for each exclusive lock comprises a process identifier for the owning since process.

2. A mechanism, according to claim 1, further comprising means for destructing lock objects, said means for destructing comprising, in the case of an exclusive lock;

means for determining if a data object referenced from the exclusive lock has been modified; and means for delaying lock destruction until any modifications to the data object have been saved.

3. A mechanism, according to claim 1, wherein exclusive locks persist across saves unless explicitly destructed.

4. A mechanism, according to claim 1, wherein a lock object in a free state can be occupied by an owning process as either a shareable lock or an exclusive lock.

* * * * *